United States Patent
Kroll

[19]

[11] Patent Number: 6,142,718
[45] Date of Patent: Nov. 7, 2000

[54] CARGO TIE-DOWN LOOP

[75] Inventor: Douglas J. Kroll, Brighton, Mich.

[73] Assignee: Lear Automotive Dearborn, Inc., Southfield, Mich.

[21] Appl. No.: 09/490,804

[22] Filed: Jan. 26, 2000

[51] Int. Cl.[7] .................................................. B60P 7/08
[52] U.S. Cl. ......................................... 410/106; 410/101
[58] Field of Search ................................... 410/101, 106, 410/110, 116; 24/115 K, 265 CD; 248/499

[56] References Cited

U.S. PATENT DOCUMENTS

| | | | |
|---|---|---|---|
| 3,765,637 | 10/1973 | Watts | 410/116 |
| 3,779,502 | 12/1973 | Marberg | 410/116 |
| 4,273,487 | 6/1981 | McLennan | 410/105 |
| 4,592,686 | 6/1986 | Andrews | 410/101 |
| 4,877,461 | 10/1989 | DeRosa et al. | 410/112 |
| 5,052,869 | 10/1991 | Hansen, II | 410/111 |
| 5,180,263 | 1/1993 | Flowers, Jr. | 410/106 |
| 5,265,992 | 11/1993 | Jensen | 410/116 |
| 5,606,784 | 3/1997 | Hamamoto . | |
| 5,738,471 | 4/1998 | Zentner et al. | 410/110 |

*Primary Examiner*—Stephen T. Gordon
*Attorney, Agent, or Firm*—MacMillan, Sobanski & Todd, LLC; William J. Clemens

[57] ABSTRACT

A vehicle cargo tie-down apparatus includes a grommet rotatably retaining a pin having an attached tie-down ring. The grommet has a generally tubular body with the pin positioned in a central aperture. Typically, the grommet body is positioned in a larger diameter first aperture in a trim piece and has a pair of resilient legs extending through a smaller diameter second aperture in a supporting wall covered by the trim piece. The pin is rotatably retained in the central aperture by a radially extending flange at one end and a locking flange at an opposite end and the legs prevent removal of the grommet from the supporting wall.

14 Claims, 1 Drawing Sheet

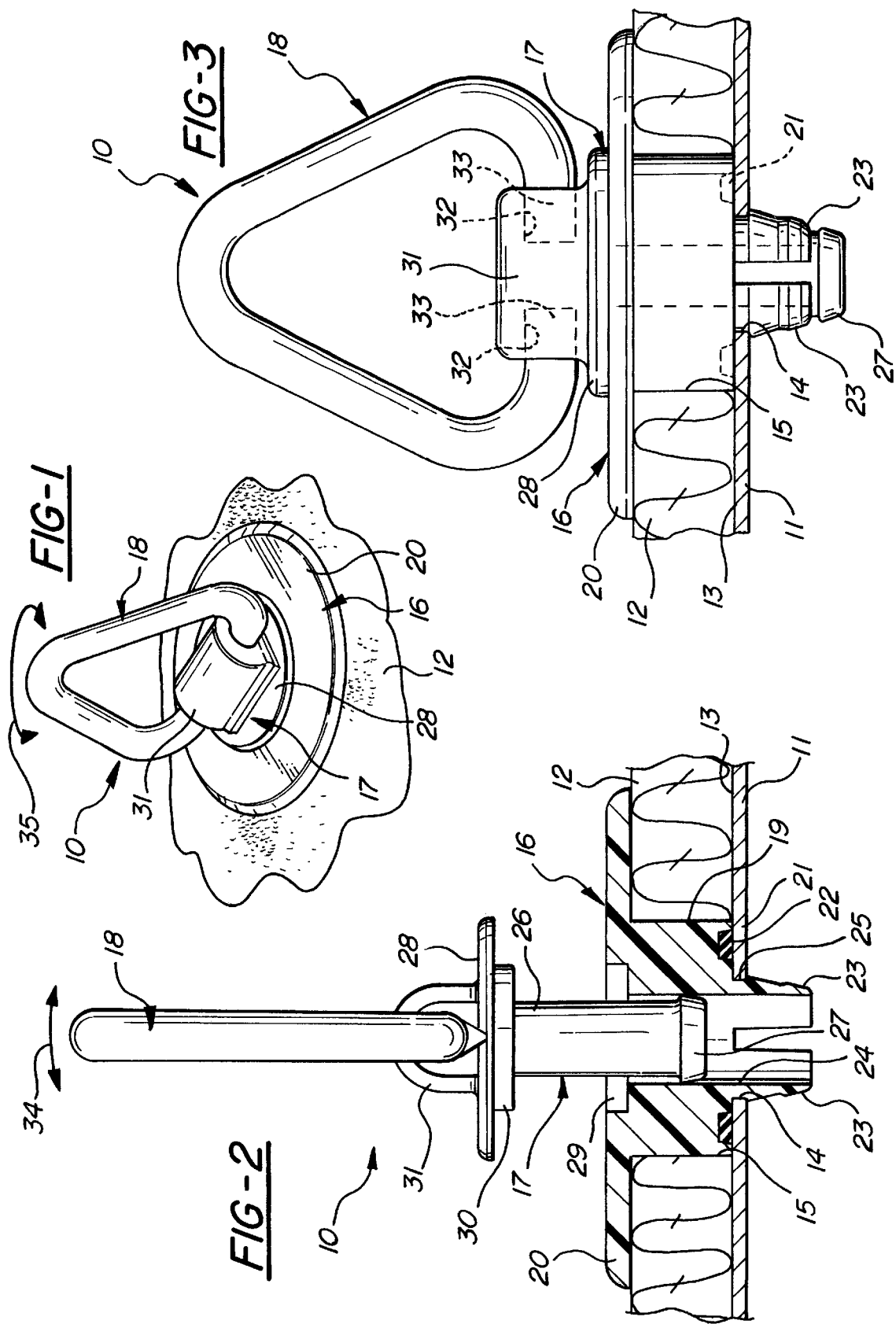

CARGO TIE-DOWN LOOP

BACKGROUND OF THE INVENTION

The present invention relates generally to tie-down devices for retaining objects in vehicles and, in particular, to such a device incorporating a one-step, push-lock feature for easy installation.

In vehicles, such as automobiles, trucks, busses, aircraft, boats and trains, it often is desirable to provide tie-down devices to secure cargo to a floor or wall to prevent unwanted motion during transit. Various anchor fittings have been developed for attaching objects to vehicle load bearing surfaces including devices that engage in permanent tracks or slots in a surface, loops or rings that are permanently attached to a vehicle surface with fasteners, and various devices that are installed in mounting holes formed in a vehicle surface.

However, increasingly the vehicle floors and walls are being covered with carpeting or trim panels surfaced with cloth, vinyl or leather. Thus, the known tie-down devices present assembly problems that increase the time and cost to finish a vehicle.

SUMMARY OF THE INVENTION

The present invention concerns a tie-down apparatus for use in a vehicle having a supporting wall covered by a trim piece. The tie-down apparatus includes a grommet, a pin rotatably retained by the grommet and a tie-down ring attached to the pin. Each of these elements is preferably formed of a plastic material. The grommet has a generally tubular body with a central aperture extending between opposed first and second ends of the grommet body, a radially extending flange at the grommet body first end and a pair of resilient legs extending axially from the grommet body second end. The grommet body flange is spaced from the grommet body second end a distance approximately equal to a thickness of a trim piece covering a supporting wall in a vehicle.

The pin has a generally cylindrical body with opposed first and second ends with a radially extending flange at the pin body first end and a lock means at the pin body second end. The pin is rotatably retained in the grommet central aperture by engagement of the pin body flange with the grommet body flange and engagement of the lock means with the legs. The ring is attached to the pin body flange for rotational movement in a plane parallel to a longitudinal axis of the pin body.

When the legs are deflected toward one another, they can pass through a smaller diameter first mounting aperture in the supporting wall and the grommet body is positioned in a larger diameter second mounting aperture in the trim piece. The grommet body second end rests on the supporting wall and the legs cooperate with the lock means to prevent removal of the pin from the central aperture. The tie-down apparatus can easily be installed by hand pressure.

It is an object of the present invention to provide a lightweight, corrosion resistant tie-down device for a vehicle.

It is another object of the present invention to reduce the cost and difficulty of installation of vehicle cargo tie-down devices.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a cargo tie-down loop in accordance with the present invention;

FIG. 2 is an enlarged cross-sectional view of the cargo tie-down loop shown in the FIG. 1 during installation; and FIG. 3 is an enlarged elevation view of the cargo tie-down loop shown in the FIG. 1.

DESCRIPTION OF THE PREFERRED EMBODIMENT

There is shown in the FIGS. 1–3 a cargo tie-down loop assembly 10 in accordance with the present invention. The loop assembly 10 is attached to a load supporting vehicle wall 11 and a piece of trim 12, such as a carpet, covers an inner surface 13 of the wall. Typically, the wall 11 is made of sheet metal that is substantially thinner than the trim piece 12. A first mounting aperture 14 is formed through the wall 11 and is concentrically aligned with a second mounting aperture 15 formed through the trim piece 12. The first mounting aperture 14 is smaller in diameter than the second mounting aperture 15.

The loop assembly 10 can be formed of any suitable material, such as a plastic, that is capable of withstanding the typical loads encountered in the intended use. For example, in an automobile, typical cargo loads may be in the 100–200 pound range. The loop assembly 10 includes a grommet 16 for receiving a pin 17 having a tie-down means such as a ring 18 attached thereto. The grommet 16 has a tubular body 19 with an external diameter sized to snugly be received in the second mounting aperture 15. A radially extending circular flange 20 is provided at a first or upper end of the body 19 for engaging an upper surface of the trim piece 12 and hiding the edge of the second aperture 15. A second or lower end of the body 19 rests on the inner surface 13 of the wall 11 and the body has a length substantially the same as the thickness of the trim piece 12. An annular recess 21 can be formed in the lower end surface of the body for retaining a seal 22 that can be an O-ring to prevent dirt and moisture that enters the first aperture 14 from outside the wall 11 from contaminating the trim piece 12. A pair of semi-circular legs 23 extend from the lower end of the body 19 about a central aperture 24 formed through the tubular body. The outer surfaces of the legs 23 taper from lower free ends upwardly and outwardly to a circumferential slot 25 having a width sufficient to receive the edge of the wall 11 surrounding the aperture 14. The lower ends of the legs 23 are at a diameter less than the diameter of the first mounting aperture 14 while the upper ends of the legs adjacent the slot 25 are at a diameter greater than that of the first mounting aperture. The material forming the grommet 16 has sufficient resiliency such that as the legs 23 are inserted into the first mounting aperture 14 at the surface 13, the legs deflect inwardly until the edge of the first mounting aperture is aligned with the slot 25 whereupon the legs snap outwardly and the grommet is retained in the first mounting aperture. The tapered resilient legs 23 enable the grommet 16 to be installed on the wall 11 utilizing hand pressure only.

The pin 17 has a cylindrical body 26 with the ring 18 attached to a first or upper end thereof and a radially extending lock 27 formed at a second or lower end thereof. The lock 27 must be able to pass through the central aperture 24 to permit insertion of the pin 17, yet engage the lower ends of the legs 23 to prevent removal of the pin and provide sufficient load holding capacity. The lock 27 can be in the form of a fixed radially extending circular flange wherein the grommet 16 and the pin 17 are assembled together before installation in the first mounting aperture 14. The diameter of the first mounting aperture 14 can be sized to deflect the legs 23 toward one another slightly closing the lower end of the central aperture 24 and preventing removal of the pin 17. An alternative could be to form the lock 27 as a split ring retained in a groove in the body 26 which ring is compressed in diameter during travel through the central aperture 24 and springs back to an uncompressed diameter as it exits the central aperture to prevent removal. Alternatively, the lock 27 can be two or more spring-biased radially movable arcuate stops that are moved radially inward during travel through the central aperture 24 and spring radially outwardly below the lower end of the legs 23.

A radially extending circular flange 28 is provided at an upper end of the body 26 for resting on an upper surface of the flange 20 of the grommet 16. The distance between the facing surfaces of the lock 27 and the flange 28 is slightly greater than the distance from the lower end of the legs 23 to the upper surface of the flange 20 so that the pin 17 is free to rotate about its longitudinal axis in the central aperture 24. The flange 20 functions as a bearing surface supporting the flange 28 for sliding rotation. A circular recess 29 can be formed in the upper surface of the flange 20 for receiving a circular guide 30 extending downwardly from the flange 28. The recess 29 and the guide 30 can be sized to prevent radial movement as the pin 17 rotates in the central aperture 24.

A mounting block 31 extends upwardly from the flange 28 and has a pair of radially extending opposed apertures 32 formed therein. Each of the apertures 32 retains a free end 33 of the ring 18 and permits the ring to rotate about a central axis of the apertures in opposite directions as shown in the FIG. 2 by an arrow 34. Thus, the ring 18 can be moved from the vertical position shown in the drawings in either direction to a substantially horizontal position thereby rotating in a plane parallel to the longitudinal axis of the body 26. The rotation of the ring 18 in the apertures 32 and the rotation of the pin 17 in the central aperture 24, as shown in the FIG. 1 by an arrow 35, provides a maximum number of tie-down positions for the cargo tie-down loop assembly 10.

Although the tie-down apparatus 10 has been shown for use with the supporting wall 11 and the trim piece 12, it can be used with various components by forming the grommet body 19 and the pin body 26 with the appropriate lengths. Furthermore, the tie-down apparatus 10 can be pre-assembled to the trim piece 12 at the point of manufacture and the assembly shipped to the vehicle manufacturer for installation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A tie-down apparatus for use in a vehicle comprising:
    a grommet having a generally tubular body with a central aperture extending between opposed first and second ends of said grommet body, said grommet having a radially extending flange at said grommet body first end and a pair of resilient legs extending axially from said grommet body second end;
    a pin having a generally cylindrical body with opposed first and second ends, a radially extending flange at said pin body first end and a lock means at said pin body second end, said pin being rotatably retained in said central aperture by engagement of said pin body flange with said grommet body flange and engagement of said lock means with said legs; and
    a tie-down means attached to said pin body flange.

2. The tie-down apparatus according to claim 1 including an annular recess formed in said grommet body second end about said central aperture and a seal positioned in said recess for sealingly contacting a supporting wall when said grommet is mounted in a mounting aperture in said wall.

3. The tie-down apparatus according to claim 1 wherein said tie-down means is a ring.

4. The tie-down apparatus according to claim 3 including a mounting block extending from said pin body flange and having a pair of apertures for rotatably retaining ends of said ring.

5. The tie-down apparatus according to claim 1 wherein said grommet, said pin and said tie-down means are formed of a plastic material.

6. The tie-down apparatus according to claim 1 wherein said grommet body flange has a recess formed therein and said pin body flange has a guide formed thereon received in said recess, said recess and said guide cooperating to prevent lateral movement of said pin in said central aperture.

7. The tie-down apparatus according to claim 1 wherein each of said legs has an outer surface tapering outwardly from a free end of said leg toward said grommet body second end.

8. The tie-down apparatus according to claim 1 including a circumferential slot formed in said legs adjacent said grommet body second end for receiving an edge of a supporting wall.

9. The tie-down apparatus according to claim 1 wherein said lock means is a radially extending flange at said pin body second end.

10. A tie-down apparatus for use in a vehicle having a supporting wall covered by a trim piece, the tie-down apparatus comprising:
    a grommet having a generally tubular body with a central aperture extending between opposed first and second ends of said grommet body, said grommet having a radially extending flange at said grommet body first end and a pair of resilient legs extending axially from said grommet body second end, said grommet body flange being spaced from said grommet body second end a distance approximately equal to a thickness of a trim piece covering a supporting wall;
    a pin having a generally cylindrical body with opposed first and second ends with a radially extending flange at said pin body first end and a lock means at said pin body second end, said pin being rotatably retained in said central aperture by engagement of said pin body flange with said grommet body flange and engagement of said lock means with said legs; and
    a ring attached to said pin body flange for rotational movement in a plane parallel to a longitudinal axis of said pin body whereby when said legs are deflected toward one another to pass through a smaller diameter first mounting aperture in the supporting wall and said grommet body is positioned in a larger diameter second mounting aperture in the trim piece, said grommet body second end rests on the supporting wall and said legs cooperate with said lock means to prevent removal of said pin from said central aperture.

11. The tie-down apparatus according to claim 10 wherein each of said legs has an outer surface tapering outwardly from a free end of said leg toward said grommet body second end.

12. The tie-down apparatus according to claim 10 including a circumferential slot formed in said legs adjacent said grommet body second end for receiving an edge of the supporting wall.

13. The tie-down apparatus according to claim 10 wherein said lock means is a radially extending flange at said pin body second end.

14. A tie-down assembly for use in a vehicle having a supporting wall covered by a trim piece, the tie-down apparatus comprising:

a trim piece having a mounting aperture formed therein;

a grommet having a generally tubular body with a central aperture extending between opposed first and second ends of said grommet body, said grommet having a radially extending flange at said grommet body first end and a pair of resilient legs extending axially from said grommet body second end, said grommet body flange being spaced from said grommet body second end a distance approximately equal to a thickness of said trim piece, said grommet body being positioned in said mounting aperture;

a pin having a generally cylindrical body with opposed first and second ends with a radially extending flange at said pin body first end and a lock means at said pin body second end, said pin being rotatably retained in said central aperture by engagement of said pin body flange with said grommet body flange and engagement of said lock means with said legs; and a tie-down means attached to said pin body flange.

* * * * *